United States Patent Office 3,203,815
Patented Aug. 31, 1965

3,203,815
HIGH-TEMPERATURE PROTECTIVE
COATING FOR METALS
Harold J. Michael, Columbus, Ohio, assignor to
North American Aviation, Inc.
No Drawing. Filed Dec. 21, 1962, Ser. No. 246,374
8 Claims. (Cl. 106—49)

This invention relates generally to a high-temperature protective coating for metals, and particularly concerns a composition which may be applied to and fused at the exterior surfaces of parts made of various metals to develop improved protection against oxidation, corrosion, chemical attack, and the like at elevated temperatures.

The composition of this invention is frequently referred to as a cermet, and is essentially comprised of ceramic and metallic materials. The ceramic material employed in this invention is, in turn, typically comprised of glass frit and refractory oxide constituents. In the instant invention particular attention is given to a novel coating composition based on the inclusion of a glass frit constituent having two distinct liquid phases at the composition firing temperature. The preferred glass frit has a lead-boro-silicate system glass which flows readily and which has a wetting function at the composition firing temperature and a sodium-barium-calcium-boro-aluminate system glass which is substantially more viscous and which serves a seal-forming function at the firing temperature of the composition. Numerous advantages may be realized from the use of the preferred type of glass frit in a combined ceramic and metallic protective coating. In addition, it should be noted that the composition of this invention may be applied to parts fabricated of various metals using generally conventional processing techniques.

It is an important object of this invention to provide a highly ductile ceramic and metallic coating which may be readily applied to the exterior surfaces of various metal parts to develop improved resistance to oxidation, atmospheric corrosion, chemical attack, and the like at elevated temperatures.

Another object of this invention is to provide a ceramic and metallic protective coating which has an improved adhesion characteristic in comparison to the adherence characteristic of known high-temperature ceramic and metallic protective coatings for metals.

Another object of this invention is to provide a high-temperature ceramic and metallic protective coating for metals which has an improved wetting characteristic or property at the firing temperature of the coating in comparison to the wetting characteristics of known ceramic and metallic protective coatings.

Another object of this invention is to provide a high-temperature ceramic and metallic protective coating for metals which has an improved seal-forming characteristic or property at the firing temperature of the coating in comparison to the seal-forming characteristic of known ceramic and metallic protective coatings.

A still further object of this invention is to provide a high-temperature ceramic and metallic protective coating which incorporates a single glass frit ingredient for developing the coating, wetting and seal-forming characteristic.

Another object of this invention is to provide a high-temperature ceramic and metallic protective coating composition which is free of constituents that normally react at elevated temperatures to destroy silica and silicates contained in the ceramic portion of the composition.

A still further object of this invention is to provide a high-temperature ceramic and metallic protective coating for metals in which glass re-crystallization phenomena do not occur during re-firing or exposure of the coating at or to elevated temperatures.

Other objects and advantages of this invention will become apparent during a careful consideration of the specification.

COMPOSITION

| Constituent | Range | Preferred Amount |
|---|---|---|
| Two-Liquid-Phase Glass Frit | 15–60 | 35.0 |
| Refractory Oxide | 2–17 | 10.0 |
| Aluminum Powder | 20–80 | 50.0 |

In addition to the above constituents an organic binder and compatible organic diluent are preferably included in the composition to prepare the coating in a proper consistency for application to the surface of different metal parts using various application techniques. Upon firing the binder and diluent are decomposed and completely oxidized. Also, a small quantity of colloidal suspending refractory material such as clay, bentonite, colloidal talc, or colloidal alumina may be advantageously incorporated in the composition.

Adjustments to the composition formulation within the range indicated may be made to primarily change the composition firing temperature within feasible limits. The preferred amounts given above relate to a composition which may be fired at approximately 1450° F. to 1500° F. and which obtains improved protection against oxidation, corrosion, chemical attack, and the like for coated metal parts exposed to corrosion-causing, etc. media or environments at temperatures approximating the firing temperature over prolonged periods of time. With the glass frit constituent being maintained at a comparatively fixed level, the firing temperature of the composition may be reduced to as low as approximately 1250° F. by increasing the aluminum powder content toward the upper limit of the prescribed range and by reducing the refractory oxide content to the lower limit of the given range. Conversely, the firing temperature of the composition may be increased to as high as approximately 1600° F. by reducing the aluminum metal content to the minimum level indicated and by increasing the refractory oxide portion of the composition to the upper limit of its specified weight range. Increases and decreases of the weight of the glass frit from the preferred amount and within the given range may be effected to adjust the wetting characteristic of the composition at firing temperature and compensate for changes in refractory oxide and powdered aluminum constituent quantities. Generally speaking, the proportion of glass frit specified in the preferred amount column is suitable for developing improved coating adhesion in most applications.

GLASS FRIT CONSTITUENT

| Oxide | Range | Preferred Amount |
|---|---|---|
| Boric Oxide (B$_2$O$_3$) | 45–55 | 52.4 |
| Lead Oxide (PbO) | 3–7 | 5.3 |
| Calcium Oxide (CaO) | 5–12 | 9.0 |
| Barium Oxide (BaO) | 5–12 | 9.0 |
| Alumina (Al$_2$O$_3$) | 8–13 | 11.0 |
| Sodium Oxide (Na$_2$O) | 8–13 | 11.6 |
| Silica (SiO$_2$) | 0.5–5 | 1.7 |
| Total | | 100.0 |

The oxide composition given above may be prepared by combining the folowing batch ingredients in the amounts specified. The formulation is:

| Ingredient | Range | Preferred Amount |
| --- | --- | --- |
| Boraic Acid | 20–53 | 35.7 |
| Anhydrous Borax | 20–35 | 29.1 |
| Aluminum Hydrate | 9–16 | 13.0 |
| Calcium Carbonate | 7–17 | 12.4 |
| Barium Carbonate | 5–12 | 9.0 |
| Litharge | 2– 6 | 4.1 |
| Silica | 0.4– 4 | 1.3 |
| Total | | 104.6 |

The above-detailed glass frit is prepared using conventional fritting techniques. The batch ingredients are preferably dry-blended until thoroughly mixed and charged into a smelting furnace. Smelting of the batch ingredients typically involves heating to temperature of from 1850° F. to 2050° F. and should be continued until the glass is formed and fined. The glass is then fritted by water or roller quenching and subsequently dried. Afterwards, and for most applications of the instant invention, the glass frit is powdered sufficiently to pass a 200 mesh standard screen. The properly prepared glass frit is added to the coating composition to comprise the glassy phase thereof.

The important characteristics of the preferred glass frit detailed above are that is has a low silica content, that it is free of halogen elements, that it has an excellent wetting property, and that it has an excellent seal-forming property at the composition firing temperature. The low silica content is to prevent re-crystallization of contained glass on refiring and during subsequent exposure of coated parts to elevated temperatures over extended periods of time. The halogen-free characteristic of the glass is developed to minimize or eliminate any possible subsequent reaction and vaporization of silica and minor silicate constituents in the glass thereby avoiding the deterioration of the developed composition glassy seal.

The wetting property of the preferred composition is distinctly superior because of the glass frit employed. The wetting property can be measured in the following manner. A standard 10 gram dry sample of the glass frit is crushed to pass a 40 mesh screen and to remain upon an 80 mesh screen. The sample is mixed with a small quantity of organic binder and diluent sufficient to develop a cohesive shape when prepared in a cylindrical die of 1″ diameter using approximately 2,000 pounds per square inch pressure. The resulting prepared 1″ diameter button is placed upon a stainless steel panel (approximately 4″ x 4″ x 0.050″) and fired at 1500° F. for 15 minutes allowing the specimen to fuse and flow. The fired and flowed frit is subsequently cooled to room temperature and as solidified has a somewhat translucent or generally opaque center portion of a crowned configuration and reduced thickness and with a surrounding general transparent ring portion of even lesser thickness. The material in the somewhat translucent center portion of the fired button constitutes, during firing, one-liquid-phase of the glass frit. During firing it possesses a lower viscosity in comparison to the surrounding material of the generally transparent ring portion. The degree of flow of the fired frit portions and the consequent wetting property may be measured as a fusion flow value on the basis of the ratio of the flowed material to the original button diameter and is expressed as a percentage which is in excess of 100%. The preferred two-phase glass frit detailed above has a viscous "sealer" phase flow value of approximately 135% and a less-viscous "wetter" phase flow value of approximately 157%. This may be expressed as having the 1″ diameter button increasing by 135% to 2¹¹⁄₃₂″ diameter as to the generally translucent refractory phase and as increasing by 157% to 2⁹⁄₁₆″ as to the more freely flowing, comparatively low viscosity liquid "wetter" phase. The flowed dimensions are established as the average of two dimensions taken at right angles to each other. The sealer phase of the preferred glass frit should have a fusion flow value (average diameter increase) of from approximately 110% to approximately 150%. However, the fusion flow value for the less-viscous phase should in any case exceed the fusion flow value of the sealer phase by from approximately 10% to approximately 22%. Thus, a glass frit having a viscous phase which increases 120% over the 1″ button diameter must have a less-viscous "wetter" phase which increases to from aproximately 132% to approximately 146.4% over the button initial diameter to have utility in my invention.

The measured and observed characteristics and properties of the glass frit are distinctly different than the corresponding properties of glass frit for vitreous enamels and ceramic material constituents which have heretofore been incorporated in known high-temperature ceramic and metallic protective coatings. It should be noted that the core portion of the flowed glass frit button specimen is essentially a sodium-barium-calcium-boroaluminate system glass. The comparatively thin surrounding ring of the less-viscous liquid phase of the flowed glass frit button specimen is essentially a lead-boro-silicate system glass which produces the improved wetting property in the protective coating composition. Use of a single glass frit to develope both the wetting and seal-forming properties of the composition eliminates the necessity of having to resolve the frit separation problem which otherwise is present when using two or more glass frits in combination. Frit separation and consequent loss of coating homogeneity results in poor coating quality.

The glass frit composition may be varied from the preferred amounts specified and within the indicated ranges to effect changes in the refractoriness quality thereof. Increases in the amount of alumina and barium oxide to the indicated upper limt, for instance, may be employed to increase the viscosity and refractoriness of the flowed glass frit. Conversely, reduction of the amount of alumina and barium oxide operates to reduce the same viscosity and refractoriness quality. An increase in the boric oxide content of the glass frit, as well as an increase in the sodium oxide content, operates to somewhat reduce the same viscosity and refractoriness quality. A minimum silica content is established in the glass frit to form a lead-boro-silicate eutectic of very low melting temperature and thereby establish an improved wetting quality.

REFRACTORY OXIDE CONSTITUENT

The refractory oxide constituent employed in the ceramic and metallic coating composition of this invention may be comprised of the oxides of nickel (chromium, aluminum, zirconium, titanium, barium, iron, or manganese by way of example. Excellent results are obtained through the use of a mixture of zirconium dioxide and chromic oxide in near-equal parts. Nickel oxide may be substituted for the chromium oxide to develop comparable properties but at somewhat higher cost. The use of manganese oxide, like the use of iron oxide, gives a better liquid phase flow characteristic if such is required. However, these latter two oxides do not have an endurance quality at elevated temperatures that is comparable to that established through the use of zirconia and chromic oxide. It should also be noted that the preferred refractory oxides are only somewhat soluble in the glass frit. Each of the refractory oxides may be added to the composition alone, in combination, or in calcined form. The added refractory oxides are part of the hereinafter-described mill charge and are thoroughly mixed with remaining materials of the composition.

ALUMINUM POWDER CONSTITUENT

The composition of this invention utilizes atomized aluminum metal powder in the preferred amount and quantities previously indicated. The aluminum powder preferably has a maximum particle size of approximately 74 microns (200 mesh). Aluminum metal powder used in the practice of this invention and meeting the above-stated −200 mesh requirements is readily available from established commercial sources.

OTHER COMPOSITION CONSTITUENTS

As previously indicated, a small quantity of a colloidal suspension material such as clay, bentonite, colloidal talc, colloidal alumina, or the like may be included in the composition to advantageously promote coating homogeneity. A total amount of approximately 2 to 9 parts by weight of colloidal suspension agent for each 100 parts of combined glass frit, refractory oxide, and aluminum powder constituents is generally preferred. A good grade of enameler's clay or a good grade of purified bentonite may be employed to advantage in the composition and at less cost than the use of colloidal talc or colloidal alumina.

The composition of this invention also advantageously utilizes an organic binder and compatible organic diluent to prepare the composition for application to individual metal parts. Some of the application techniques which may be used in connection with the instant invention include brushing, spraying, and dipping. Adjustment of the viscosity of the to-be-applied coating may be readily effected by persons skilled in the art primarily through the variation of quantity of included binder and diluent. The selection of particular binder and diluent materials are also considered to be within the capability of the state-of-the-art. For a description of various conventional binder and diluent materials reference may be made to the teaching of U.S. Letters Patents No. 2,898,253, issued August 4, 1959. In the hereinafter-provided composition examples the use of a liquid acryloid resin organic binder and a liquid acryllic nitrocellulose lacquer thinner is preferred.

EXAMPLE COMPOSITIONS

A preferred embodiment of the coating composition is detailed immediately below. The amounts given are on a parts by weight basis.

Example I

Constituent: Preferred amount
Two-liquid-phase glass frit (−200 mesh) ____ 35.0
Chromic oxide ($Cr_2O_3$) _____ 5.0
Zirconium dioxide ($ZrO_2$) _____ 5.0
Atomized aluminum metal powder _____ 50.0
Enameler's clay _____ 5.0
Bentonite _____ 1.0
Liquid acryloid resin _____ 34.0
Liquid acrylic nitrocellulose lacquer thinner__ 30.0

The constituents listed above are preferably weighed, ball-milled for approximately 4 hours, and then drained drained from the mill into a vat or container. The glass frit should pass a 200 mesh screen prior to addition to the mill batch. The quantity of resin binder and lacquer thinner diluent given adapts the to-be-applied coating materials to a dipping/draining application technique. If a brushing application is to be employed, approximately 65 parts of liquid squeegee oil may be substituted for the designated resin and diluent materials. This particular composition has a firing temperature of approximately 1450° F. to 1500° F.

Example II

This example of the coating of my invention is based on the constituent amounts of the Example I composition except that: the glass frit content is 45 parts, the chromic oxide ($Cr_2O_3$) content is increased to 10 parts, the zirconium dioxide ($ZrO_2$) content is increased to 7 parts, and the atomized aluminum metal powder content reduced to approximately 20 parts. This Example II composition may be fired at a temperature of approximately 1600° F.

Example III

The composition of this Example is based on the amounts of the constituents of the composition of Example I except that: the glass frit content is 27 parts, the chromic oxide ($Cr_2O_3$) content is reduced to 2 parts, the zirconium dioxide ($ZrO_2$) content is also reduced to 2 parts, and the atomized aluminum metal powder constituent increased to approximately 80 parts. This particular composition has a firing temperature of approximately 1250° F.

APPLICATION

The protective coating of this invention may be applied and fused or fired to different parts fabricated of various metals. There are no limitations upon the invention dictated by the size or configuration of the part except that application, firing, and handling equipment must have an adequate capability. The coating may be applied to different metals and the only significant limitation in this respect is that the metal which is to be coated must withstand the firing temperaure of the combined ceramic and metallic coating constituents. The coating of this invention is particularly important in relation to developing improved protection against corrosion, oxidation, and chemical attack for materials such as low-alloy steels (SAE 1010 and 1020), stainless steels, cast iron, cast steel, titanium, and the like.

When applying the coating of this invention, several pre-application steps are preferred. First, the metal part should be cleaned thoroughly using vapor or alkali cleaning techniques. Second, the surface of the part should then be abraded using any of several state-of-the-art abrasive materials. If abrasive action such as sand-blasting is unsuited to the part, acid pickling or etching may be used to develop the required degree of surface roughness.

A sheet metal part fabricated of SAE 1010 low-carbon steel may be provided with the high-temperature protective coating of this invention as follows. Subsequent to preparation of the exterior surface of the part using the cleaning techniques identified above, the part was coated with the composition of Example I. The part was dipped in the specified composition, drained of excess materials, and allowed to force-dry at a temperature of from 250° F. to 400° F. until all visible traces of diluent disappeared. The coated article was then placed in an oxidizing furnace atmosphere at a firing temperature of 1450° F. to 1500° F. The organic binder and diluent constituents of the coating were decomposed and removed from the coating by oxidation during firing. The article was held at the designated firing temperature for a minimum of 10 minutes. Afterwards, the part was cooled to normal room temperature. The thickness of the fired protective coating varied from 3 to 5 mils.

In the case of massive parts it may be necessary to retain the coated part in the furnace at the firing temperature for longer periods of time to assure proper firing. Prolonged exposure to the firing temperature does not affect the quality of the resultant coating. If warpage of the part upon cooling is possible, furnace cooling of the part may be desirable.

The part coated as instructed above was subjected to numerous tests. For instance, the part has been exposed to an oxygen-containing atmosphere at 1500° F. in excess of 750 continuous hours. No measurable deterioration of the coating was experienced. The coated part was subjected to thermal shock cycling for 20 cycles without any noticeable or detectable failure. Each cycle involved heating the part to 1500° F. and suddenly placing the heated part in tap water at normal room temperature. The coated steel sheet metal part was also subjected to the sandard PEI deformation test. A 100% adherence of the coating to the metal was observed. In addition, neither the coating nor substrate metal is deteriorated during 600 hours of testing in a standard salt spray environment and after deformation by the PEI deformation adherence test die. Further, the part coated did not fail when subjected to an impact. Other tests given the coating have established that it is highly resistant to the corrosive gases of internal combustion engines at elevated temperatures and is also resistant to acid furnace atmospheres.

I claim:

1. A ceramic and metallic protective coating composition for application to metals at a firing temperature of approximately 1250° F.–1600° F., said coating composition consisting of from 15 to 60 parts by weight of a homogeneous two-liquid-phase glass frit having included wetting and seal-forming glass systems, from 2 to 17 parts by weight of refractory oxide selected from the group consisting of the oxides of aluminum, barium, chromium, iron, manganese, nickel, titanium, and zirconium, and from 20 to 80 parts by weight of powdered alumium metal, said glass frit having a calculated oxide content of from 45% to 55% boric oxide, from 3% to 7% lead oxide, from 5% to 12% calcium oxide, from 5% to 12% barium oxide, from 0.5% to 5% silica, from 8% to 13% sodium oxide, and from 8% to 13% aluminum oxide.

2. The coating composition defined by claim 1, wherein said refractory oxide selected from said group consists of near-equal parts of chromic oxide and zirconium dioxide.

3. The coating composition defined by claim 1, wherein there is included a binder and diluent, said binder consisting of liquid acryloid resin, and said diluent consisting of liquid nitrocellulose lacquer thinner.

4. A ceramic and metallic protective coating composition for application to metals at a firing temperature of approximately 1450° F.–1500° F., said coating composition consisting of: approximately 35 parts by weight of a homogeneous two-liquid-phase glass frit which includes a sodium-barium-calcium-boro-aluminate system glass and a lead-boro-silicate system glass, approximately 10 parts by weight of refractory oxide selected from the group consisting of the oxides of aluminum, barium, chromium, iron, manganese, nickel, titanium, and zirconium and approximately 50 parts by weight of powdered aluminum metal, said glass frit having a calculated oxide content of from 45% to 55% boric oxide, from 3% to 7% lead oxide, from 5% to 12% calcium oxide, from 5% to 12% barium oxide, from 0.5% silica, from 8% to 13% sodium oxide, and from 8% to 13% aluminum oxide.

5. The coating composition defined by claim 4, wherein said glass frit has a calculated oxide content of approximately 52% boric oxide, approximately 5% lead oxide, approximately 9% calcium oxide, approximately 9% barium oxide, approximately 2% silica, approximately 11% sodium oxide, and approximately 11% aluminum oxide.

6. The coating composition defined by claim 4 wherein there is included a binder and diluent, said binder consisting of liquid acryloid resin, and said diluent consisting of liquid nitrocellulose lacquer thinner.

7. The coating composition defined by claim 1, wherein said homogeneous two-liquid-phase glass frit has a seal-forming glass system with a fusion flow value in the range of approximately 110% to 150% and has a wetting glass system with a fusion flow value greater than said seal-forming glass system fusion flow value by from 10% to 22%, said fusion flow values being determined on the basis of glass frit fusion flow at approximately 1500° F.

8. The coating composition defined by claim 1, wherein said two-liquid-phase glass frit has a seal-forming glass system with a fusion flow value of approximately 135% and has a wetting glass system with a fusion flow value of approximately 157%, said fusion flow values being determined on the basis of glass frit fusion flow at approximately 1500° F.

References Cited by the Examiner

UNITED STATES PATENTS

| | | | |
|---|---|---|---|
| 2,457,678 | 12/48 | Jira | 106—49 |
| 2,843,507 | 7/58 | Long | 106—48 |
| 2,863,782 | 12/58 | Eubank et al. | 106—47 |
| 2,889,238 | 6/59 | Long et al. | 106—48 |
| 2,898,236 | 8/59 | Long et al. | 106—48 |
| 2,898,253 | 8/59 | Schneider et al. | 148—20.6 |

TOBIAS E. LEVOW, *Primary Examiner.*